(12) United States Patent
Li et al.

(10) Patent No.: US 11,641,447 B2
(45) Date of Patent: *May 2, 2023

(54) SYSTEM AND METHOD FOR AUTOMATICALLY ADJUSTING KEY FRAME QUANTIZATION PARAMETER AND FRAME RATE

(71) Applicant: Agora Lab, Inc., Santa Clara, CA (US)

(72) Inventors: Jiang Li, Hangzhou (CN); Zheyuan Zhang, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/727,952

(22) Filed: Apr. 25, 2022

(65) Prior Publication Data

US 2022/0256114 A1 Aug. 11, 2022

Related U.S. Application Data

(63) Continuation of application No. 17/172,395, filed on Feb. 10, 2021, now Pat. No. 11,343,467.

(51) Int. Cl.
*H04N 7/14* (2006.01)
*H04N 7/15* (2006.01)
*H04N 19/70* (2014.01)
*H04N 19/124* (2014.01)

(52) U.S. Cl.
CPC ........... *H04N 7/141* (2013.01); *H04N 19/124* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 10,542,283 B2 | 1/2020 | Kumar | |
| 11,343,467 B1 * | 5/2022 | Li | H04N 7/141 |
| 2007/0009041 A1 | 1/2007 | Wang | |
| 2016/0285945 A1 | 9/2016 | Pai | |
| 2016/0373697 A1 | 12/2016 | Avni | |
| 2017/0237784 A1 | 8/2017 | Maistri | |

\* cited by examiner

*Primary Examiner* — Quoc D Tran
(74) *Attorney, Agent, or Firm* — The Law Offices of Konrad Sherinian, LLC; Depeng Bi

(57) ABSTRACT

A new real-time video communication device improves the clarity of shared screen by automatically adjusting the key frame's quantization parameter values. The adjustment depends on the underlying network's connection condition. When the connection bandwidth deteriorates, the key frame's quantization parameter value is further decreased on the value output from a standard H.264 encoder to derive a desirable quantization parameter value and thus achieve a desirable user experience of the shared screen. Moreover, the new real-time video communication device adjusts the frame rate of the shared screen based on the present quantization parameter value to achieve a more desirable user experience of the screen sharing.

8 Claims, 5 Drawing Sheets

SYSTEM AND METHOD FOR AUTOMATICALLY ADJUSTING KEY FRAME QUANTIZATION PARAMETER AND FRAME RATE

CROSS REFERENCE TO RELATED APPLICATIONS

This application is a continuation of co-pending U.S. patent application Ser. No. 17/172,395, entitled "SYSTEM AND METHOD FOR AUTOMATICALLY ADJUSTING KEY FRAME QUANTIZATION PARAMETER AND FRAME RATE", filed Feb. 10, 2021, which is hereby incorporated by reference in its entirety.

FIELD OF THE DISCLOSURE

The present invention generally relates to real-time video communication, and more particularly relates to a real-time video communication system and method for sharing a screen. More particularly still, the present disclosure relates to a real-time screen sharing system that automatically adjusts quantization parameter and frame rate.

DESCRIPTION OF BACKGROUND

In real-time video communication systems, both audio and video data are exchanged between participating electronic devices (such as laptop computers, desktop computers, tablet computers, smartphones, etc.). Real-time video communication systems usually follow an industrial standard, such as H.264. H.264 (also referred to as Advanced Video Coding, or MPEG-4 Part 10, Advanced Video Coding), is a video compression standard based on block-oriented, motion-compensated integer-DCT coding. It is jointly developed by the International Telecommunications Union (ITU) and International Organization for Standardization (ISO)/International Electrotechnical Commission (IEC) Moving Picture Experts Group (MPEG). It is also standardized by the ITU-T Video Coding Experts Group (VCEG) of Study Group 16 together with the ISO/IEC JTC1 Moving Picture Experts Group.

During a real-time video communication session (such as a video conference meeting), each participating electronic device captures audio data using a microphone device and video data using a camera device. Received audio data is played back via a speaker device while received video data is played on a display device. The real-time video communication systems are desired to simultaneously exchange data with negligible latency for acceptable user experience. The immediacy of the real-time video communication systems is critically important for users.

During real-time video communication sessions, participants oftentimes desire to share one of the participants' computer screens. For example, what is displayed on a first device's display screen is sent to and displayed on other participating devices' display screen. Screensharing is a common function in real-time video communication. Screensharing needs to be simultaneous or near simultaneous without noticeable latency. In other words, the latency in screensharing needs to be negligible for desired user experience. Screensharing has its own unique characteristics as well. Screen display usually includes text, graphical lines and other graphical elements, and thus requires higher level of clarity for readers (i.e., participants other than the one who shares her/his computer screen) than video frames captured by cameras do. Choppy display of the shared display screen on the receiving devices is undesirable. For example, burring letters is not desirable. Furthermore, the content of the shared display screen usually does not change frequently, which is different from a camera's view that changes frequently. Therefore, the requirement for high frequency of transmission of the screen to other participating devices is lower.

Accordingly, there is a need for a new system and method that improves the sharpness and clarity of screen content in screensharing based on the characteristics of screensharing. In addition, the conditions of the underlying communication networks (such as Wi-Fi connections and the Internet) of the real-time video communication systems change in real-time as well. The inbound traffic bandwidth and outbound traffic bandwidth both constantly change. Accordingly, the new system and method is desired to automatically reconfigure the shared screen encoding component based on the network condition to achieve high level of screen clarity. Other desired goals include low latency and bandwidth requirement in screensharing.

SUMMARY OF THE DISCLOSURE

Generally speaking, pursuant to the various embodiments, the present disclosure provides a method for automatically adjusting quantization parameter in display screen sharing based on a network connection condition in a real-time video communication system. The method is performed within a real-time video communication system electronic device. The method includes setting an initial value to a shared display screen key frame quantization parameter by a specialized real-time video communication software application running on the real-time video communication system electronic device. The real-time video communication system electronic device includes a processing unit; a memory element operatively coupled to the processing unit; an input interface operatively coupled to the processing unit; an audio output interface operatively coupled to the processing unit; a network interface operatively coupled to the processing unit; a video output interface operatively coupled to the processing unit; a video input interface operatively coupled to the processing unit; an audio input interface operatively coupled to the processing unit; and the specialized real-time video communication software application adapted to be executed by the processing unit. The method further includes determining a current bandwidth measure of a network connection. The real-time video communication system electronic device is adapted to share a screen displayed on the video output interface with a set of electronic devices within the real-time video communication system over the network connection. The method also includes retrieving a quantization parameter value to the shared display screen key frame quantization parameter of a key frame of the shared display screen from a video encoder; adjusting the retrieved quantization parameter value to create an adjusted quantization parameter value by the specialized real-time video communication software application; encoding the key frame of the shared display screen using the adjusted quantization parameter value; setting the key frame as a long term reference frame for other non-key frames; and sending the encoded key frame of the shared display screen to the set of electronic devices over the network connection. In one implementation, the key frame of the shared display screen is an instantaneous decoder refresh frame; the key frame quantization parameter is an instantaneous decoder refresh frame quantization parameter; and the video encoder is an H.264 encoder. In one embodiment, the specialized software application adjusts the retrieved quantization parameter value to create the adjusted quantization parameter value by decreasing the retrieved quantization parameter value by two when the bandwidth measure is bigger than 800 kbps; decreasing the retrieved quantization parameter value by four when the bandwidth measure is between 800 kbps and 400 kbps; decreasing the retrieved quantization parameter value by six when the bandwidth measure is between 400 kbps and 200 kbps; and decreasing the retrieved quantization parameter value by eight when the bandwidth measure is below 200 kbps.

Further in accordance with the present teachings is a method for automatically adjusting frame rate in display screen sharing based on a quantization parameter in a real-time video communication system. The method is performed within a real-time video communication system electronic device. The method includes setting an initial frame rate value for encoding frames of a shared display screen by a specialized real-time video communication software application running on the real-time video communication system electronic device. The real-time video communication system electronic device includes a processing unit; a memory element operatively coupled to the processing unit; an input interface operatively coupled to the processing unit; an audio output interface operatively coupled to the processing unit; a network interface operatively coupled to the processing unit; a video output interface operatively coupled to the processing unit; a video input interface operatively coupled to the processing unit; an audio input interface operatively coupled to the processing unit; and the specialized real-time video communication software application adapted to be executed by the processing unit. The method also includes retrieving a present quantization parameter value of the most recently sent frame or a next frame of the shared display screen; determining a set of categories of quantization parameter values; determining a set of frame rate adjustments corresponding to the set of categories of quantization parameter values; determining a frame rate adjustment within the set of frame rate adjustments based on the present quantization parameter value; determining a new frame rate based on a present frame rate and the frame rate adjustment; determining a time when to send a next frame based on the new frame rate; setting the new frame rate as the present frame rate; encoding the next frame; and, at the time, sending the next frame to a set of electronic devices within the real-time video communication system. In one implementation, the present quantization parameter value is retrieved from a video encoder. Furthermore, the video encoder is an H.264 encoder. In one embodiment, the set of categories of quantization parameter values includes a category of zero through twenty; a category of twenty through twenty five; a category of twenty five through thirty; a category of thirty through thirty five; and a category of thirty five through fifty; and the set of frame rate adjustments corresponding to the set of categories of quantization parameter values includes a frame rate adjustment of one; a frame rate adjustment of one-half; a frame rate adjustment of zero; a frame rate adjustment of negative one-half; and a frame rate adjustment of negative one.

Further in accordance with the present teachings is a real-time video communication system electronic device for automatically adjusting quantization parameter in display screen sharing based on a network connection condition in a real-time video communication system. The device includes a processing unit; a memory element operatively coupled to the processing unit; an input interface operatively coupled to the processing unit; an audio output interface operatively coupled to the processing unit; a network interface operatively coupled to the processing unit; a video output interface operatively coupled to the processing unit; a video input interface operatively coupled to the processing unit; an audio input interface operatively coupled to the processing unit; a real-time video communication software application adapted to be executed by the processing unit; and the real-time video communication software application. The application is adapted to set an initial value to a shared display screen instantaneous decoder refresh frame quantization parameter; determine a current bandwidth measure of a network connection, wherein the real-time video communication system electronic device is adapted to share a screen displayed on the video output interface with a set of electronic devices within the real-time video communication system over the network connection; retrieve a quantization parameter value to the shared display screen instantaneous decoder refresh frame quantization parameter of a current instantaneous decoder refresh frame from an H.264 encoder; adjust the retrieved quantization parameter value to create an adjusted quantization parameter value by decreasing the retrieved quantization parameter value by two when the bandwidth measure is bigger than 800 kbps; decreasing the retrieved quantization parameter value by four when the bandwidth measure is between 800 kbps and 400 kbps; decreasing the retrieved quantization parameter value by six when the bandwidth measure is between 400 kbps and 200 kbps; and decreasing the retrieved quantization parameter value by eight when the bandwidth measure is below 200 kbps. The application is further adapted to encode the instantaneous decoder refresh frame of the shared display screen using the adjusted quantization parameter value; and send the encoded instantaneous decoder refresh frame of the shared display screen to the set of electronic devices over the network connection.

Further in accordance with the present teachings is a real-time video communication system electronic device for automatically adjusting quantization parameter in display screen sharing based on a network connection condition in a real-time video communication system. The device includes a processing unit; a memory element operatively coupled to the processing unit; an input interface operatively coupled to the processing unit; an audio output interface operatively coupled to the processing unit; a network interface operatively coupled to the processing unit; a video output interface operatively coupled to the processing unit; a video input interface operatively coupled to the processing unit; an audio input interface operatively coupled to the processing unit; a real-time video communication software application adapted to be executed by the processing unit. The application is adapted to set an initial value to a shared display screen key frame quantization parameter; determine a current bandwidth measure of a network connection, the real-time video communication system electronic device adapted to share a screen displayed on the video output interface with a set of electronic devices within the real-time video communication system over the network connection; retrieve a quantization parameter value to the shared display screen key frame quantization parameter of a key frame of the shared display screen from a video encoder; adjust the retrieved quantization parameter value to create an adjusted quantization parameter value; encode the key frame of the shared display screen using the adjusted quantization parameter value; set the key frame as a long term reference frame for other non-key frames; and send the encoded key frame of the shared display screen to the set of electronic devices over the network connection. In one implementation, the key frame of the shared display screen is an instantaneous decoder refresh frame; the key frame quantization parameter is an instantaneous decoder refresh frame quantization parameter; and the video encoder is an H.264 encoder. The application adjusts the retrieved quantization parameter value to create the adjusted quantization parameter value by decreasing the retrieved quantization parameter value by two when the bandwidth measure is bigger than 800 kbps; decreasing the retrieved quantization parameter value by four when the bandwidth measure is between 800 kbps and 400 kbps; decreasing the retrieved quantization parameter value by six when the bandwidth measure is between 400 kbps and 200 kbps; and decreasing the retrieved quantization parameter value by eight when the bandwidth measure is below 200 kbps.

Further in accordance with the present teachings is a real-time video communication system electronic device for automatically adjusting frame rate in display screen sharing based on a quantization parameter in a real-time video communication system. The device includes a processing unit; a memory element operatively coupled to the processing unit; an input interface operatively coupled to the processing unit; an audio output interface operatively coupled to the processing unit; a network interface operatively coupled to the processing unit; a video output interface operatively coupled to the processing unit; a video input interface operatively coupled to the processing unit; an audio input interface operatively coupled to the processing unit; and a real-time video communication software application adapted to be executed by the processing unit. The application is adapted to set an initial frame rate value for encoding frames of a shared display screen of the real-time video communication electronic device; retrieve a present quantization parameter value of the most recently sent frame or a next frame of the shared display screen; determine a set of categories of quantization parameter values; determine a set of frame rate adjustments corresponding to the set of categories of quantization parameter values; determine a frame rate adjustment within the set of frame rate adjustments based on the present quantization parameter value; determine a new frame rate based on a present frame rate and the frame rate adjustment; determine a time when to send a next frame based on the new frame rate; set the new frame rate as the present frame rate; encode the next frame; and at the time, send the next frame to a set of electronic devices within the real-time video communication system. In one implementation, the present quantization parameter value is retrieved from a video encoder. In another implementation, the video encoder is an H.264 encoder. In one embodiment, the set of categories of quantization parameter values includes a category of zero through twenty; a category of twenty through twenty five; a category of twenty five through thirty; a category of thirty through thirty five; and a category of thirty five through fifty; and the set of frame rate adjustments corresponding to the set of categories of quantization parameter values includes a frame rate adjustment of one; a frame rate adjustment of one-half; a frame rate adjustment of zero; a frame rate adjustment of negative one-half; and a frame rate adjustment of negative one.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
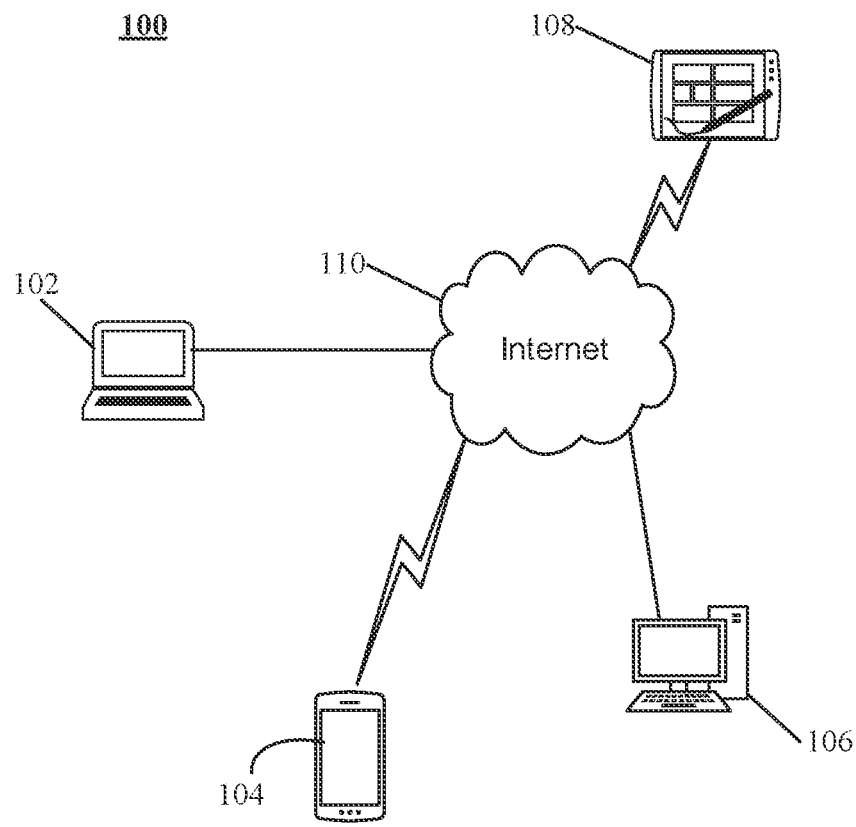
FIG. 1 is an illustrative block diagram of a real-time video communication system in accordance with the teachings of this disclosure.

Turning to the Figures and to FIG. 1 in particular, an illustrative block diagram of a real-time video communication system is shown and generally indicated at 100. The real-time video communication system 100 includes a set of participating electronic devices, such as those indicated at 102, 104, 106 and 108. The real-time video communication system electronic devices 102-108 communicate with each other over the Internet 110. They connect to the Internet 110 via local area networks, such as Wi-Fi networks, public cellular phone networks, Ethernet networks, etc. Each of the electronic devices 102-108 is further illustrated by reference to FIG. 2.

Figure 2:
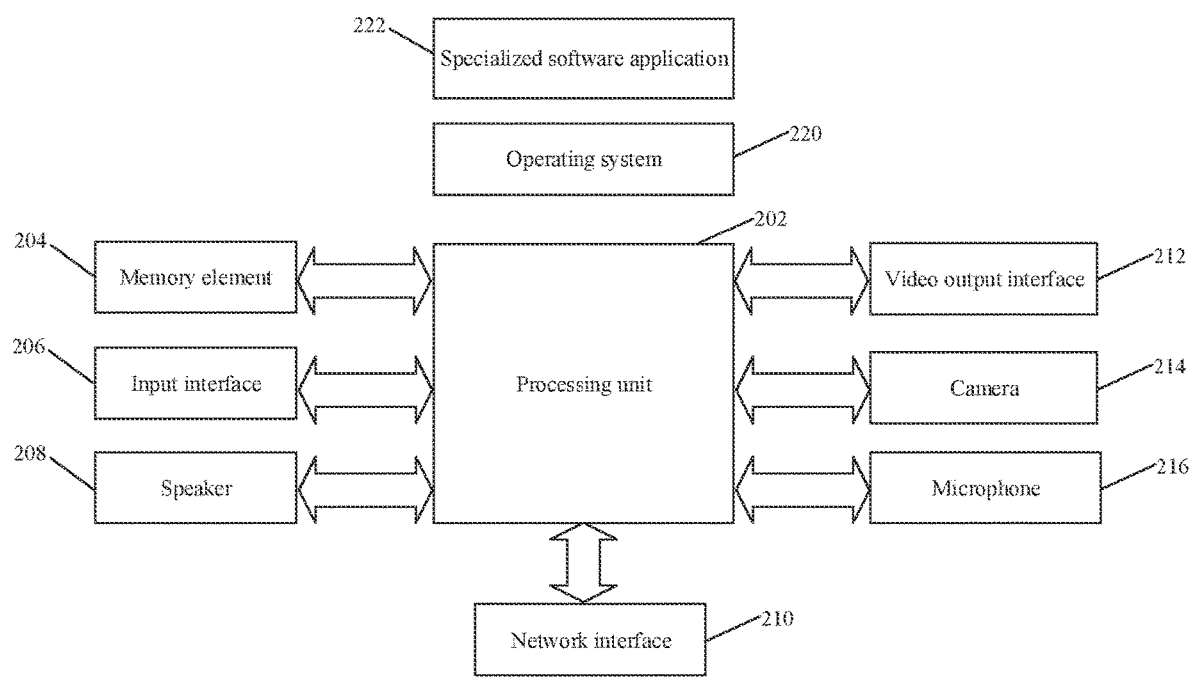
FIG. 2 is an illustrative block diagram of a real-time video communication device in accordance with this disclosure.

Referring to FIG. 2, a simplified block diagram of a real-time video communication device, such as the device 102, is shown. The device 102 includes a processing unit (such as a central processing unit (CPU)) 202, some amount of memory 204 operatively coupled to the processing unit 202, one or more input interfaces (such as a mouse interface, a keyboard interface, a touch screen interface, etc.) 206 operatively coupled to the processing unit 202, an audio output interface 208 operatively coupled to the processing unit 202, a network interface 210 operatively coupled to the processing unit 202, a video output interface 214 (such as a display screen) operatively coupled to the processing unit 202, a video input interface 214 (such as a camera) operatively coupled to the processing unit 202, and an audio input interface 214 (such as a microphone) operatively coupled to the processing unit 202. The device 102 also includes an operating system 220 and a specialized real-time video communication software application 222 adapted to be executed by the processing unit 202. The real-time video communication software application 222 is programmed using one or more computer programming languages, such as C, C++, C#, Java, etc. It includes or uses a video encoder, an audio encoder, a video decoder and an audio decoder. As used herein, the encoders and decoders are said to be part of the specialized real-time video communication software application 222.

The specialized real-time video communication software application 222 sends video data (such as frames captured by the video input device 214), audio data (such as audio data captured by the audio input device 216) and screen data (such as video output displayed on the monitor screen 212) to other participating devices, receives video data, audio data and screen data from other participating devices, and outputs the received data on the device on which it is running. Screen data is data of the shared display screen, such as that of the device 102. It may include text and graphics. The screen data is sent to other devices by frames, which are further shown in FIG. 3. The receiving devices (such as the devices 104-108) receive the frames and render them on the respective local video output devices 212.

Figure 3:
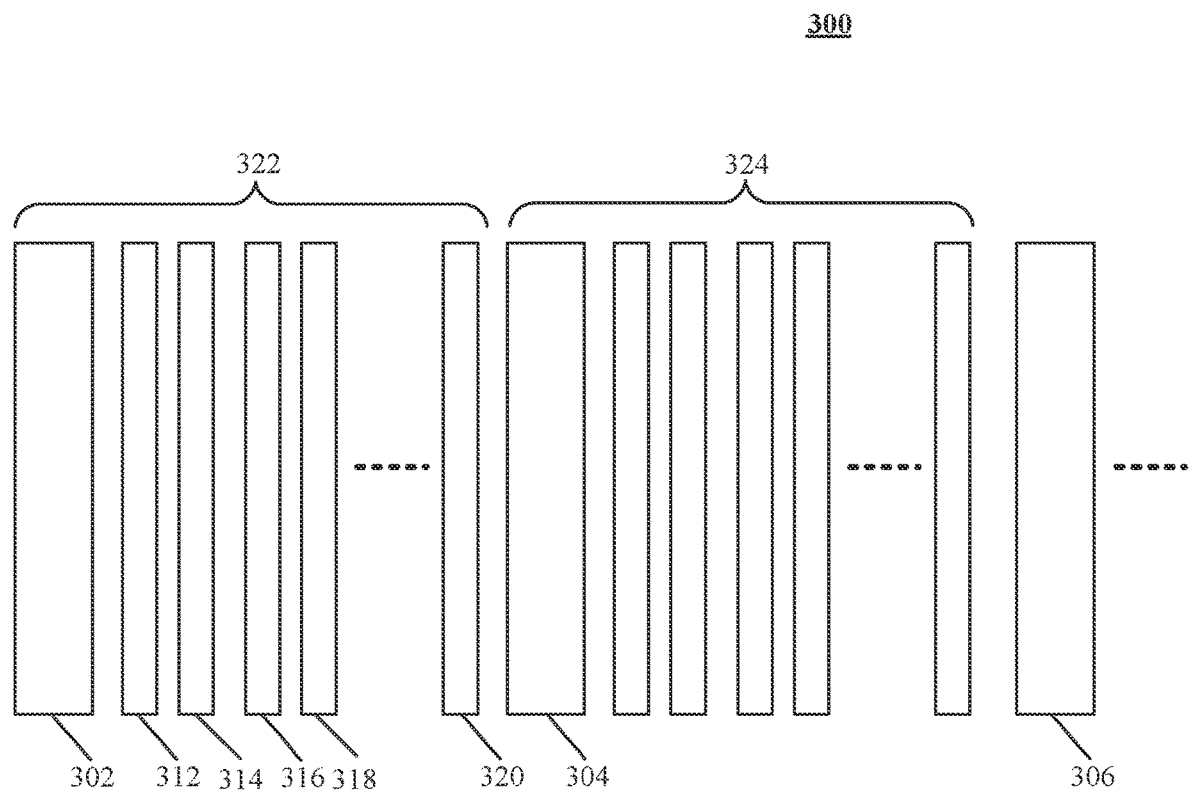
FIG. 3 is illustrative block diagram of a sequence of display screen data frames of a shared screen during a real-time video communication session in accordance with this disclosure.

Referring to FIG. 3, a simplified block diagram of a sequence of display screen data frames are shown and generally indicated at 300. The frames 300 are generated by and sent from the device 102 to the devices 104-108 when the screen 212 of the device 102 is the shared screen between the participating devices 102-108 in a real-time video communication session. The frames 302, 304 and 306 are key frames, such as Instantaneous Decoder Refresh (IDR) frames defined in H.264. The key frames 302-306 each are a fully encoded frame, and a complete image. The encoding is performed by an encoder of the software application 222. The frames 312-320 between the two consecutive key frames 302-304 are inter frames, such as P-frames defined in H.264. Each inter frame includes the differences from one or more other frames. The key frame 302 and the inter frames 312-320 are also collectively referred to as a Group of Pictures (GOP) and indicated at 322. Another GOP is indicated at 324. As used herein, the GOP 322 is the current GOP to each of the inter frames 312-320. The key frame 302 is referred to herein as the key frame of the GOP 322 and each of the inter frames within the GOP 322. Similarly, the key frame 304 is the key frame of the GOP 324 and each of the inter frames within the GOP 324.

Furthermore, the first inter frame of two consecutive inter frames is the previous interface frame of the other inter frame. Key frames are encoded without information from other frames. Inter frames are encoded with information from other frames. For instance, each inter frame is encoded with information of its key frame and previous frame. In such a case, the inter frame 316 is encoded with information from its key frame 302 and its previous frame 314. The frames 302 and 314 are thus termed herein as reference frames to the inter frame 316. The key frame 302 is also referred to herein as the long-term reference frame to each of the inter frame 312-320, while the inter frame 314 is referred to herein as the short-term reference frame to the inter frame 316.

The time period between two consecutive key frames is termed herein as the key frame frequency, such as 200 ms (meaning a new key frame is sent every 200 milliseconds). The number of frames that the specialized software application sends out to other participating devices is termed herein as the frame rate, such as 15.

The quality of a shared screen when displayed on the receiving devices' 104-108 display screens 212 depends on the value of a Quantization Parameter (QP) under the H.264 frame work. For instance, the clarity of a key frame (such as an IDR frame in H.264 paradigm) depends on the key frame's QP value. A lower QP value corresponds to a higher level of clarity. In H.264, residuals are transformed into the spatial frequency domain by an integer transform that approximates the familiar Discrete Cosine Transform. The QP determines the step size for associating the transformed coefficients with a finite set of steps. Large QP values represent big steps that crudely approximate the spatial transform, such that most of the signal can be captured by only a few coefficients. Small QP values more accurately approximate the block's spatial frequency spectrum, but at the cost of more network bandwidth use.

When the quality of the network connection between the device 102 and other devices 104-108, it is desirable to reduce the video frame quality of the key frames. Key frames of lower clarity consume less network bandwidth. By consuming less network bandwidth, the key frames can be received by the receiving devices in a timely manner. However, a standard H.264 encoder outputs QP values for key frames that are too high. The direct result is that the clarity of IDR frames is too low and unacceptable to users. Furthermore, the standard H.264 encoder fails to fully consider the underlying network throughput bitrates when it outputs QP values for IDR frames. The improved process for encoding key frames with more desirable QP values and thus more desirable clarity of the shared screen on the devices 104-108 is further illustrated by reference to FIG. 4.

Figure 4:
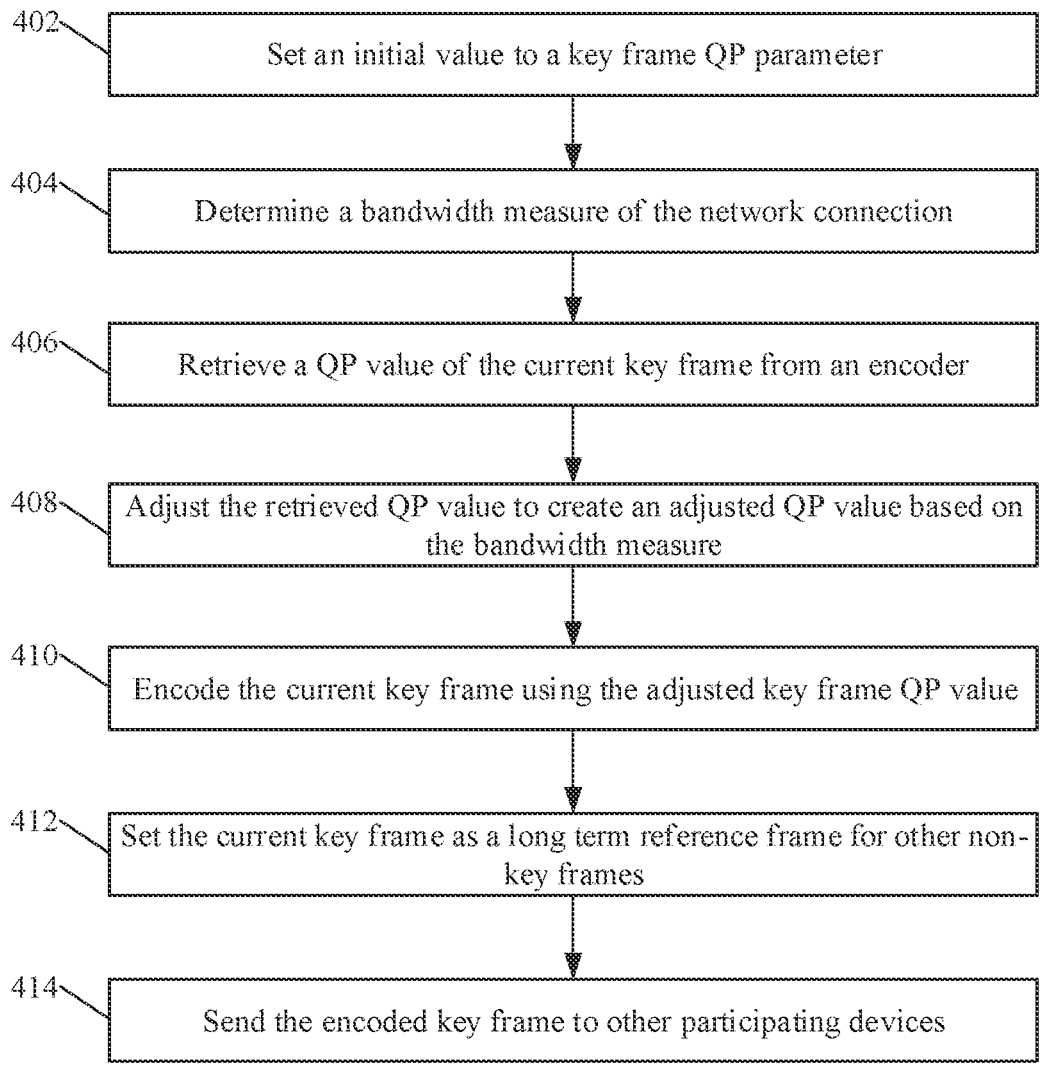
FIG. 4 is a flowchart depicting a process by which a real-time video communication device automatically adjusts a shared screen's key frames' QP values based on the underlying network's condition in accordance with this disclosure.

Referring to FIG. 4, a flowchart depicting a process by which the specialized software application 222 automatically adjusting key frames' QP values based on the underlying network's condition is shown and generally indicated at 400. At 402, the specialized software application 222 sets an initial value, such as 24, to the key frame QP parameter (such as the IDR frame QP parameter under the H.264 architecture) for sharing the display screen of the device 102. Once the initial value is set, a key frame can be encoded using, for example, a standard H.264 encoder. The encoded key frame is sent to the receiving devices 104-108 from the device 102. Thereafter, inter frames are encoded and sent to the receive devices 104-108.

However, the condition of the underlying network connection between the devices 102-108 fluctuates. Accordingly, it is desirable to adapt the key frame QP parameter to the actual network bandwidth condition. At 404, the specialized software application 222 determines the current bandwidth measure of the underlying network connection. The determined bandwidth measure is an estimated bitrate that is available for the specialized software application 222 to transmit shared screen data, video data and other data to other devices. The bandwidth estimation is performed by considering various factors, such as network packet loss rate and packet round trip time (RTT).

At 406, the specialized software application 222 retrieves a QP value for the QP parameter of the current key frame, such as an IDR frame. In one implementation, the QP value is output from a standard H.264 encoder. At 408, the specialized software application 222 adjusts the retrieved QP value to create an adjusted QP value based on the bandwidth measure. In one implementation, when the bandwidth is bigger than 800 kbps, the retrieved QP value is decreased by two to create the adjusted QP value; when the bandwidth is between 800 kbps and 400 kbps, the retrieved QP value is decreased by four to create the adjusted QP value; when the bandwidth is between 400 kbps and 200 kbps, the retrieved QP value is decreased by six to create the adjusted QP value; and when the bandwidth is below 200 kbps, the retrieved QP value is decreased by eight to create the adjusted QP value. The amount of the adjustment (such has two, four, six and eight referenced above) is referred to herein as a key frame QP adjustment.

At 410, the specialized software application 222 encodes the current key frame (such as an IDR frame) using the adjusted QP value. In one implementation, at 410, the specialized software application 222 calls an H.264 encoder to encode the IDR frame. Alternatively, the specialized software application 222 invokes a different module to encode the next IDR frame using the adjusted QP value. At 412, the specialized software application 222 sets the current key frame as a long term reference frame for other non-key frames. At 414, the specialized software application 222 sends the encoded next key frame to other participating devices in the real-time video communication session.

To improve the clarity of the shared screen when it is displayed on the receiving devices 104-108, the specialized software application 222 further adjusts the frame rate based on the present QP value. The process by which the specialized software application 222 adjusts the frame rate based on the present QP value is further illustrated by reference to FIG. 5.

Figure 5:
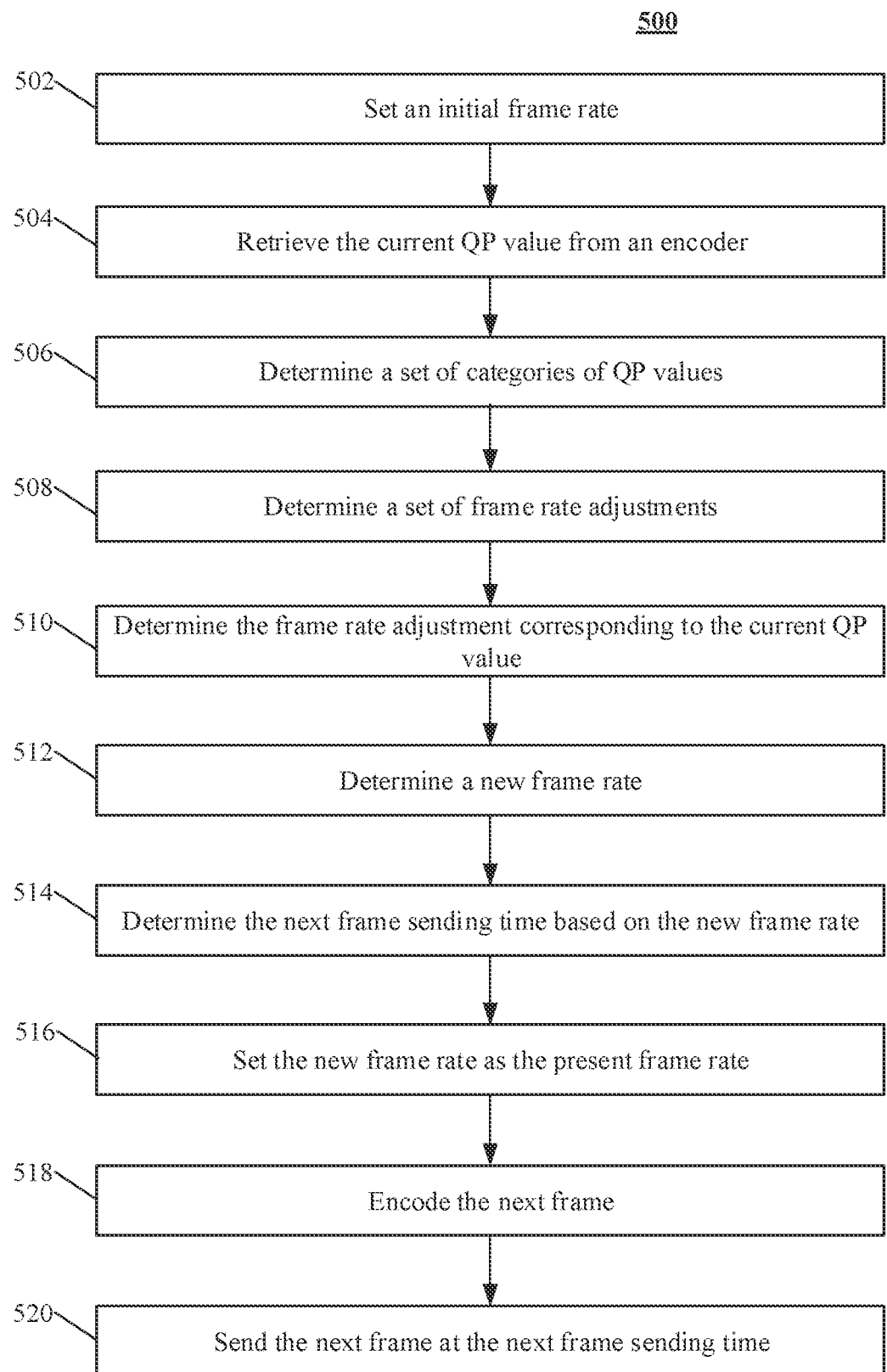
FIG. 5 is a flowchart depicting a process by which a real-time video communication device automatically adjusts the shared screen frame rate based on the present QP value in accordance with this disclosure.

Referring to FIG. 5, a flowchart depicting a process by which the specialized software application 222 automatically adjusts the frame rate based on the present QP value is shown and generally indicated at 500. At 502, the specialized software application 222 sets an initial frame rate, such as fifteen (15), for encoding frames of the shared display screen of the device 102. At the frame rate 15, the specialized software application 222 encodes and sends out 15 frames of the display screen 212 of the device 102 to other participating devices 104-108. At 504, the specialized software application 222 retrieves the present QP value, such as the QP value of the most recently sent frame or the next frame of the shared display screen 212 of the device 102. In one implementation, the QP value is output from a standard H.264 encoder. At 506, the specialized software application 222 determines a set of categories of QP values. In one implementation, the set of categories of QP values includes five categories: zero through twenty; twenty through twenty five; twenty five through thirty; thirty through thirty five; and thirty five through fifty. At 508, the specialized software application 222 determines a set of frame rate adjustments corresponding to the set of categories of QP values. For instance, the adjustments for the five categories set forth above are one (1), one-half (0.5), zero (0), negative one-half (−0.5) and negative one (−1).

At 510, the specialized software application 222 determines the frame rate adjustment based on the present QP value. For example, when the current QP value is twenty three (23), the frame rate adjustment to be selected is thus 0.5. As another example, when the current QP value is forty (40), the frame rate adjustment to be selected is thus −1. At 512, the specialized software application 222 determines a new frame rate, which is the sum of the present frame rate and the frame rate adjustment determined at 510. At 514, the specialized software application 222 determines the time when to send the next frame based on the new frame rate. For instance, when the frame rate is changed from 15 to 16, the next frame sending time is about 62.5 milliseconds, instead of 66.67 milliseconds, from the time when the previous frame was sent out. At 516, the specialized software application 222 sets the next frame rate as the present frame rate. At 518, the specialized software application 222 encodes the next frame. At 520, the specialized software application 222 sends the encoded next frame to the receiving devices.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A real-time video communication system electronic device for automatically adjusting quantization parameter in display screen sharing based on a network connection condition in a real-time video communication system, said real-time video communication system electronic device comprising:
   1) a processing unit;
   2) a memory element operatively coupled to said processing unit;
   3) an input interface operatively coupled to said processing unit;
   4) an audio output interface operatively coupled to said processing unit;
   5) a network interface operatively coupled to said processing unit;
   6) a video output interface operatively coupled to said processing unit;
   7) a video input interface operatively coupled to said processing unit;
   8) an audio input interface operatively coupled to said processing unit;
   9) a real-time video communication software application adapted to be executed by said processing unit; and
   10) said real-time video communication software application adapted to:

(a) set an initial value to a shared display screen instantaneous decoder refresh frame quantization parameter;
(b) determine a current bandwidth measure of a network connection, wherein said real-time video communication system electronic device is adapted to share a screen displayed on said video output interface with a set of electronic devices within said real-time video communication system over said network connection;
(c) retrieve a quantization parameter value to said shared display screen instantaneous decoder refresh frame quantization parameter of a current instantaneous decoder refresh frame from an H.264 encoder;
(d) adjust said retrieved quantization parameter value to create an adjusted quantization parameter value by:
  i) decreasing said retrieved quantization parameter value by two when said bandwidth measure is bigger than 800 kbps;
  ii) decreasing said retrieved quantization parameter value by four when said bandwidth measure is between 800 kbps and 400 kbps;
  iii) decreasing said retrieved quantization parameter value by six when said bandwidth measure is between 400 kbps and 200 kbps; and
  iv) decreasing said retrieved quantization parameter value by eight when said bandwidth measure is below 200 kbps;
(e) encode said instantaneous decoder refresh frame of said shared display screen using said adjusted quantization parameter value; and
(f) send said encoded instantaneous decoder refresh frame of said shared display screen to said set of electronic devices over said network connection.

2. A real-time video communication system electronic device for automatically adjusting quantization parameter in display screen sharing based on a network connection condition in a real-time video communication system, said real-time video communication system electronic device comprising:
1) a processing unit;
2) a memory element operatively coupled to said processing unit;
3) an input interface operatively coupled to said processing unit;
4) an audio output interface operatively coupled to said processing unit;
5) a network interface operatively coupled to said processing unit;
6) a video output interface operatively coupled to said processing unit;
7) a video input interface operatively coupled to said processing unit;
8) an audio input interface operatively coupled to said processing unit;
9) a real-time video communication software application adapted to be executed by said processing unit; and
10) said real-time video communication software application adapted to:
  (a) set an initial value to a shared display screen key frame quantization parameter;
  (b) determine a current bandwidth measure of a network connection, said real-time video communication system electronic device adapted to share a screen displayed on said video output interface with a set of electronic devices within said real-time video communication system over said network connection;
  (c) retrieve a quantization parameter value to said shared display screen key frame quantization parameter of a key frame of said shared display screen from a video encoder;
  (d) adjust said retrieved quantization parameter value to create an adjusted quantization parameter value;
  (e) encode said key frame of said shared display screen using said adjusted quantization parameter value;
  (f) set said key frame as a long term reference frame for other non-key frames; and
  (g) send said encoded key frame of said shared display screen to said set of electronic devices over said network connection.

3. The real-time video communication system electronic device of claim 2 wherein:
1) said key frame of said shared display screen is an instantaneous decoder refresh frame;
2) said key frame quantization parameter is an instantaneous decoder refresh frame quantization parameter; and
3) said video encoder is an H.264 encoder.

4. The real-time video communication system electronic device of claim 2 wherein said specialized software application adjusts said retrieved quantization parameter value to create said adjusted quantization parameter value by:
1) decreasing said retrieved quantization parameter value by two when said bandwidth measure is bigger than 800 kbps;
2) decreasing said retrieved quantization parameter value by four when said bandwidth measure is between 800 kbps and 400 kbps;
3) decreasing said retrieved quantization parameter value by six when said bandwidth measure is between 400 kbps and 200 kbps; and
4) decreasing said retrieved quantization parameter value by eight when said bandwidth measure is below 200 kbps.

5. A real-time video communication system electronic device for automatically adjusting frame rate in display screen sharing based on a quantization parameter in a real-time video communication system, said real-time video communication system electronic device comprising:
1) a processing unit;
2) a memory element operatively coupled to said processing unit;
3) an input interface operatively coupled to said processing unit;
4) an audio output interface operatively coupled to said processing unit;
5) a network interface operatively coupled to said processing unit;
6) a video output interface operatively coupled to said processing unit;
7) a video input interface operatively coupled to said processing unit;
8) an audio input interface operatively coupled to said processing unit; and
9) a real-time video communication software application adapted to be executed by said processing unit; and
10) said real-time video communication software application adapted to:
  (a) set an initial frame rate value for encoding frames of a shared display screen of said real-time video communication electronic device;

(b) retrieve a present quantization parameter value of the most recently sent frame or a next frame of said shared display screen;
(c) determine a set of categories of quantization parameter values;
(d) determine a set of frame rate adjustments corresponding to said set of categories of quantization parameter values;
(e) determine a frame rate adjustment within said set of frame rate adjustments based on said present quantization parameter value;
(f) determine a new frame rate based on a present frame rate and said frame rate adjustment;
(g) determine a time when to send a next frame based on said new frame rate;
(h) set said new frame rate as said present frame rate;
(i) encode said next frame; and
(j) at said time, send said next frame to a set of electronic devices within said real-time video communication system.

6. The real-time video communication system electronic device of claim 5 wherein said present quantization parameter value is retrieved from a video encoder.

7. The real-time video communication system electronic device of claim 6 wherein said video encoder is an H.264 encoder.

8. The real-time video communication system electronic device of claim 5 wherein:
1) said set of categories of quantization parameter values includes a category of zero through twenty; a category of twenty through twenty five; a category of twenty five through thirty; a category of thirty through thirty five; and a category of thirty five through fifty; and
2) said set of frame rate adjustments corresponding to said set of categories of quantization parameter values includes a frame rate adjustment of one; a frame rate adjustment of one-half; a frame rate adjustment of zero; a frame rate adjustment of negative one-half; and a frame rate adjustment of negative one.

* * * * *